United States Patent
Ho et al.

(10) Patent No.: US 9,422,407 B2
(45) Date of Patent: *Aug. 23, 2016

(54) PROCESS OF POLYMER MODIFIED ASPHALT PREPARATION

(71) Applicant: Husky Oil Operations Limited, Calgary, Alberta (CA)

(72) Inventors: Susanna Ho, Calgary (CA); Daryl MacLeod, Calgary (CA); James Brown, Lloydminster (CA); Lloyd Gee, Lloydminster (CA); Ludo Zanzotto, Calgary (CA)

(73) Assignee: Husky Oil Operations Limited, Calgary, Alberta (CA)

( * ) Notice: Subject to any disclaimer, the term of this patent is extended or adjusted under 35 U.S.C. 154(b) by 113 days.

This patent is subject to a terminal disclaimer.

(21) Appl. No.: 14/155,144

(22) Filed: Jan. 14, 2014

(65) Prior Publication Data

US 2014/0128515 A1 May 8, 2014

Related U.S. Application Data

(63) Continuation of application No. 12/242,579, filed on Sep. 30, 2008, now Pat. No. 8,664,302.

(30) Foreign Application Priority Data

Nov. 6, 2007 (CA) .................................. 2609893

(51) Int. Cl.
*C08L 31/00* (2006.01)
*C08J 3/22* (2006.01)
*C08L 95/00* (2006.01)

(52) U.S. Cl.
CPC ............... *C08J 3/226* (2013.01); *C08L 95/00* (2013.01); *C08J 2495/00* (2013.01)

(58) Field of Classification Search
CPC ........................................................ C08J 3/226
USPC ..................................................... 524/68, 71
See application file for complete search history.

(56) References Cited

U.S. PATENT DOCUMENTS

| 4,145,322 A | 3/1979 | Maldonado et al. |
| 4,330,449 A | 5/1982 | Maldonado et al. |
| 5,508,112 A | 4/1996 | Planche et al. |
| 5,618,862 A | 4/1997 | Germanaud et al. |
| 5,672,642 A | 9/1997 | Gros |
| 5,719,216 A | 2/1998 | Schermer et al. |
| 5,773,496 A | 6/1998 | Grubba |
| 6,407,152 B1 | 6/2002 | Butler et al. |
| 6,429,241 B1 | 8/2002 | Liang |
| 6,441,065 B1 | 8/2002 | Chevillard et al. |
| 6,451,886 B1 | 9/2002 | Krivohlavek et al. |
| 6,713,540 B2 | 3/2004 | Rached et al. |
| 6,818,687 B2 | 11/2004 | Memon |
| 6,927,245 B2 | 8/2005 | Buras et al. |
| 6,956,071 B2 | 10/2005 | Butler et al. |
| 7,081,492 B1 | 7/2006 | Krivohlavek |
| 7,202,290 B2 | 4/2007 | Stuart, Jr. et al. |
| 8,664,302 B2 * | 3/2014 | Ho .......................... C08J 3/226 523/351 |

FOREIGN PATENT DOCUMENTS

| CA | 1321276 C | 8/1993 |
| CA | 2609893 A1 | 5/2009 |
| CA | 2609893 C | 9/2013 |

OTHER PUBLICATIONS

AASHTO Standards M320-05, 25th Edition, (2005), "Standard specification for performance graded asphalt binder." *Standard Specification for Transportation Materials and Methods of Sampling and Testing. Part 1B, American Association of State Highway and Transportation Officials*. Washington, D.C. M320-1 to 7.

ASTM Designation: D7405-10a, "Standard Test Method for Multiple Stress Creep and Recovery (MSCR) of Asphalt Binder Using a Dynamic Shear Rheometer", ASTM Int'l, West Conshohocken, PA, USA, 2010, 4 pgs.

* cited by examiner

*Primary Examiner* — Hannah Pak
(74) *Attorney, Agent, or Firm* — Frost Brown Todd LLC

(57) ABSTRACT

A process of preparing a polymer modified asphalt (PMA) comprising mixing a predetermined amount of a polymer-asphalt master batch with a predetermined amount of an asphalt-cross linking agent blend. The polymer-asphalt master batch comprises at least one polymer and a first asphalt. The asphalt-cross linking agent blend comprises a second asphalt and at least one cross linking agent. A predetermined amount of the polymer-asphalt master batch is blended with a predetermined amount of the asphalt-cross linking agent blend to form a PMA blend. Mixing of the PMA blend is performed without substantial delay following blending of the polymer-asphalt master batch with the asphalt-cross linking agent blend.

9 Claims, No Drawings

PROCESS OF POLYMER MODIFIED ASPHALT PREPARATION

PRIOR APPLICATIONS

This application is a continuation of U.S. patent application Ser. No. 12/242,579, filed on Sep. 30, 2008, now allowed, the contents of which are incorporated herein by reference.

FIELD OF INVENTION

The present invention relates to a process of polymer modified asphalt (PMA) preparation. More particularly, it is related to a process for preparing a storage-stable PMA.

BACKGROUND OF THE INVENTION

Polymer modified asphalts (PMAs) are useful for many applications, for example, but not limited to paving materials, roofing materials, products for protection of car bottoms and other coating applications. PMAs typically have good phase compatibility between the asphalt and the polymer, and should be stable at high temperature (storage stable) for ease of handling and application. For paving uses, it is desirable to have a PMA with a low viscosity at 135° C. ("135° C. viscosity"), for easy pumping, handling, and mixing at lower temperatures. These features translate into savings in energy costs and also minimize the danger of the polymer in the PMA decomposing at high temperatures. In specification AASHTO M320 (Superpave specification; [1]), it is indicated that the viscosity at 135° C. of paving asphalt should be no higher than 3000 mPa·s to ensure the pumping and handling of the PMA.

Several polymers have been identified that are effective modifiers for use in PMA preparations, in terms of weight percentage of polymer per increase of the Superpave high-temperature performance grade (AASHTO M320) [1], or in terms of improved rutting resistance. However, these known polymers often cannot be used, because they cause gelling, or are characterized as exhibiting a high 135° C. viscosity (i.e. above 3000 mPa·s).

In the manufacturing of PMAs, it is highly desirable to have the polymer molecules cross link to each other, forming a polymer network within the asphalt to provide hot-storage stability, improved rutting resistance and fatigue cracking resistance. A cross linking agent, such as sulfur, is generally added to the asphalt with the polymer to link up the polymer chains to form a network. However, the cross linking of the polymer molecules should not be so excessive that they no longer function as a liquid at high temperatures, but instead form semi-solids or gels. As sulfur, or an alternative cross linking agent, comes into contact with the polymer, some localized high concentrations of sulfur may cause excessive link-up of the polymer molecules and the formation of big lumps, which increases the 135° C. viscosity, and may even gel the resultant PMA.

A known method of producing PMAs involves high-shearing a polymer into an asphalt, and then adding a cross linking agent, such as sulfur or a sulfur containing compound, to create a polymer network within the asphalt (see for example U.S. Pat. Nos. 4,145,322, 4,330,449, 5,508,112, 5,719,216, 5,773,496 and Canadian patent 1,321,276). Following curing, the PMAs are typically stored at high temperatures (about 150° C.) before use. The methods disclosed in these patents work well with some asphalts, various types of polymers, and a number of different cross linking agents. However, several PMAs prepared using this method will gel after production or curing. Other PMAs prepared using this method are not storage stable and will gel after hot-storage of less than a week.

Depending on the type of polymer used, a PMA prepared using known methods may sometimes have high 135° C. viscosity, and also contain lumps, because of non-even cross linking of the polymer. The non-even cross linking is generally a result of contact of localized concentrations of sulfur or an alternative cross linking agent, with the polymer in the asphalt. In an attempt to solve this problem, many different approaches have been devised over the years including:

1. Gradual addition of sulfur, or an alternative cross linking agent, over a period of time, such as 12 hours, for example as disclosed in U.S. Pat. No. 6,429,241;
2. Use of multi-component or expensive cross linking agents, for example as disclosed in U.S. Pat. Nos. 5,508,112, 6,407,152, 6,451,886, 6,713,540, 6,956,071, and 7,081,492;
3. Use of a carrier oil to dilute the cross linking agent and polymer, for example as disclosed in U.S. Pat. No. 6,441,065;
4. Use of a mineral oil mixed with an activator to be added to the asphalt with the polymer to prevent a gel or lumps forming in the asphalt, for example as disclosed in U.S. Pat. No. 6,818,687; and
5. Use of a hydrocarbon dispersant, such as 2-ethylhexyl acid phosphate and oil, to be attracted to a polar cross linking agent, such as sulfur, for example as disclosed in U.S. Pat. No. 6,927,245.

Even though these methods may work for some PMA systems, the methods generally either involve a long and tedious sulfur addition process or the use of costly cross linking agents, and the need for extra carrier material, such as a dispersant chemical and oil.

U.S. Pat. No. 5,672,642 discloses a process for preparing a storage stable asphalt-polymer blend. The first step in the process involves contacting sulfur with asphalt to form a blend. A polymer, such as urethane, polyester, styrenic or olefin thermoplastic elastomer, is then added to the asphalt-sulfur blend to form a PMA.

SUMMARY OF THE INVENTION

The present invention relates to a process of polymer modified asphalt (PMA) preparation.

It is an object of the invention to provide an improved process for preparing a PMA.

According to the present invention there is provided a process for preparing a polymer modified asphalt (PMA) comprising:
  i) preparing a polymer-asphalt master batch comprising at least one polymer and a first asphalt;
  ii) preparing an asphalt-cross linking agent blend comprising at least one cross linking agent and a second asphalt;
  iii) blending a predetermined amount of the polymer-asphalt master batch with a predetermined amount of the asphalt-cross linking agent blend to form a PMA blend;
  iv) mixing the PMA blend for a period of time to allow a polymer network to form within the first and second asphalt, wherein mixing is performed at the same time as blending step iii) or without substantial delay following blending step iii); and
  v) allowing the PMA blend to cure for a period of time.

The present invention pertains to a process as just defined wherein the polymer-asphalt master batch is prepared by mixing at least one polymer into the first asphalt at a temperature of about 150 to about 200° C., or any temperature therebetween. The polymer content in the resulting polymer-asphalt master batch may be about 0.5 to about 60% by weight, or any amount therebetween.

The present invention pertains to a process as just defined wherein the asphalt-cross linking agent blend is prepared by mixing at least one cross linking agent into the second asphalt at a temperature of about 120 to about 200° C., for about 0.2 to about 3.0 hours, or any temperature or time therebetween. The cross linking agent content in the resulting asphalt-cross linking agent blend may be about 0.01 to about 5.00% by weight, or any amount therebetween.

The present invention pertains to a process as just defined wherein in blending step iii), the resulting PMA blend comprises about 0.5 to about 60% by weight of the at least one polymer and between about 0.01 to about 5.0% by weight of the at least one cross linking agent.

In blending step iii), the predetermined amount of the polymer-asphalt master batch may be added to the predetermined amount of the asphalt-cross linking agent blend, or vice versa.

The present invention pertains to a process as just defined wherein in mixing step iv), the PMA blend is mixed for about 0.5 to about 48 hours at a temperature of about 120 to about 210° C., or any temperature or time therebetween.

The present invention pertains to a process as just defined, wherein in curing step v) the PMA blend is cured at about 120 to about 200° C. for about 1 hour to about 20 days, or any temperature or time therebetween.

The first asphalt and the second asphalt may be the same or different asphalt compositions. The present invention pertains to a process as just defined, wherein the first asphalt and the second asphalt are the same asphalt compositions.

By using the process of the present invention, PMAs may be prepared using polymers that generally cause gelling or an exceedingly high 135° C. viscosity when the PMAs are prepared using known methods. By choosing different ratios of the polymer-asphalt master batch to the asphalt-cross linking agent blend, and asphalts of suitable compositions, allows for the preparation of various performance grades (PGs) of PMA according to AASHTO Superpave specification of PMA [1].

A PMA produced using the method of the present invention advantageously has a lower 135° C. viscosity than a PMA with the same composition produced using known methods. Because of the reduction in the 135° C. viscosity, the PMAs produced using the process of the present invention may contain higher levels of cross linking agent, which ensures a more complete polymer network formation, without gelling of the PMA. Furthermore, a higher content of cross linking agent in the PMA, allows a more effective use of the polymer. In other words, a PMA prepared with the same amount of polymer using the process of the present invention, as is used to prepared a PMA using known methods, will attain better performance grade (PG) of PMA, in terms of rutting and cracking resistances.

PMAs produced using the process of the present invention may have the following advantages over PMAs produced using known methods:

Improvement in Superpave high-temperature grades;
Reduction of Superpave dynamic shear rheometer (DSR) phase angle;
Improvement in Superpave creep and recovery results; and
Improvement in Superpave low-temperature grades.

It is common practice in the asphalt industry to prepare a polymer-asphalt master batch and then dilute it with asphalt to make the final product, thereby saving energy and time in the high-shearing of the polymer, and increasing product throughput. The process of the present invention disperses the cross linking agent in the asphalt used to dilute the polymer-asphalt master batch, thus there is no need for a carrier oil, multi-component cross linking agent or dispersant and production costs are reduced. The process of the present invention is therefore, not only simple to perform, for example there is no requirement to add components such as sulfur over a long period of time, but also can be performed at a reduced cost compared to methods of production of PMAs known in the art.

This summary of the invention does not necessarily describe all features of the invention.

DETAILED DESCRIPTION

The present invention relates to a process of polymer modified asphalt (PMA) preparation.

The following description is of a preferred embodiment.

The present invention pertains to a process of preparing a PMA comprising mixing a predetermined amount of a polymer-asphalt master batch with a predetermined amount of an asphalt-cross linking agent blend.

The polymer-asphalt master batch comprises at least one polymer and a first asphalt. The at least one polymer may be one type of polymer or two or more different polymers. A wide variety of polymers may be used in this invention to provide desired PMA characteristics, for example, but not limited to, low 135° C. viscosity, storage stability, improved rutting resistance and fatigue cracking resistance. Suitable polymers include, but are not limited to, urethane, polyester, styrenic and olefin thermoplastic elastomer. The polymer may be a styrene-butadiene-styrene (SBS) polymer as used in the present examples, however, a person of skill in the art will recognize that any polymer that produces a PMA with desired characteristics can be used in the process of the present invention.

The polymer can be added in an amount sufficient to impart the above mentioned desired characteristics to the PMA. The polymer content in the resulting polymer-asphalt master batch may be about 0.5 to about 60% by weight, or any amount therebetween, for example 0.5, 1, 2, 4, 6, 8, 10, 12, 14, 16, 18, 20, 22, 24, 26, 28, 30, 32, 34, 36, 38, 40, 42, 44, 46, 48, 50, 52, 54, 56, 58 and 60 percent by weight, or any amount therebetween. Preferably the polymer content in the resulting polymer-asphalt master batch is about 1 to about 40% by weight.

The polymer is added to the first asphalt under any conditions conventionally used by those skilled in the art. The asphalt-polymer master batch may be mixed over a period of time in order to ensure good blending, for example but not limited to about 0.1 to about 10.0 hours, or any time therebetween, for example 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5 and 10.0 hours, or any time therebetween. The polymer can be added to the first asphalt at a temperature sufficient to allow handleability of the asphalt, but below a temperature at which the polymer will degrade. Preferably, the temperature is about 120 to about 210° C., or any temperature therebetween, for example 120, 125, 130, 135, 140, 145, 150, 155, 160, 165, 170, 175, 180, 185, 190, 195, 200, 205 and 210° C., or any temperature therebetween.

The asphalt-cross linking agent blend comprises a second asphalt and at least one cross linking agent. The at least one cross linking agent may be one type of cross linking agent or two or more different cross linking agent. A wide variety of cross linking agent may be used in this invention that act to link up the polymer chains to form a network and give the resulting PMA the above mentioned desired characteristics. Suitable cross linking agents include, but are not limited to, sulfur, sulfur containing cross linking agents, a mercaptotriazine cross linking agent, or any cross linking agent known to professionals skilled in the art. The cross linking agent used in the process of the present invention is preferably sulfur, as used in the present examples. However, a person of skill in the art will recognize that any cross linking agent that produces a PMA with desired characteristics can be used in the process of the present invention.

The cross linking agent can be added in an amount sufficient to link up the polymer chains to form a network without causing excessive cross linking, so that the resulting PMA still functions as a liquid at high temperatures. The cross linking agent content in the resulting asphalt-cross linking agent blend may be about 0.01 to about 5.00% by weight, or any amount therebetween, for example 0.01, 0.10, 0.20, 0.30, 0.40, 0.50, 0.60, 0.70, 0.80, 0.90, 1.00, 1.10, 1.20, 1.30, 1.40, 1.50, 1.60, 1.70, 1.80 1.90, 2.00, 2.10, 2.20, 2.30, 2.40, 2.50, 2.60, 2.70, 2.80, 2.90, 3.00, 3.10, 3.20, 3.40, 3.50, 3.60, 3.70, 3.80, 3.90, 4.00, 4.10, 4.20, 4.30, 4.40, 4.50, 4.60, 4.70, 4.80, 4.90 and 5.00 percent by weight, or any amount therebetween. Preferably, the amount of cross linking agent in the asphalt-cross linking agent blend is about 0.01 to about 2.00% by weight.

The cross linking agent is added to the second asphalt under any conditions conventionally used by those skilled in the art, for example but not limited to, the cross linking agent may be added to the second asphalt with good mixing, high shearing or low shearing. The asphalt-cross linking agent blend may be mixed over a period of time in order to ensure good blending, for example but not limited to about 0.1 to about 3.0 hours, or any time therebetween, for example 0.1 0.2, 0.3, 0.4, 0.5, 0.6, 0.7, 0.8, 0.9, 1.0, 1.1, 1.2, 1.3, 1.4, 1.5, 1.6, 1.7, 1.8 1.9, 2.0, 2.1, 2.2, 2.3, 2.4, 2.5, 2.6,2.7, 2.8, 2.9 and 3.0 hours, or any time therebetween. The cross linking agent may be added to the second asphalt at a temperature sufficient to allow handleability of the blend. Preferably, the temperature is about 120 to about 200° C., or any temperature therebetween, for example 120, 125, 130, 135, 140, 145, 150, 155, 160, 165, 170, 175, 180, 185, 190 195 and 200° C., or any temperature therebetween.

The first and second asphalt may be the same or of different asphalt compositions. The first and second asphalt may comprise a single type of asphalt or a mixture of different types of asphalt. Any asphalt commonly used in industry for construction or adhesive applications may be suitable for use in the process of the present invention, for example, but not limited to, asphalts useful for roofing, paving, adhesive and coating applications.

The asphalt used in this invention may be obtained from a variety of sources, for example, but not limited to, straight-run vacuum residue; mixtures of vacuum residue with diluents such as vacuum tower wash oil, paraffin distillate, aromatic and naphthenic oils, and mixtures thereof; oxidized vacuum residues or oxidized mixtures of vacuum residues and diluent oils; and the like. Other asphaltic materials such as coal tar pitch, rock asphalt, and naturally occurring asphalt may also be used, as part or whole of the asphalt composition.

The amount of asphalt necessary must be sufficient to impart the desired adhesiveness, hydrophobicity and weatherability to the final PMA product. In asphalt-polymer blend paving applications, the asphalt will typically comprise about 80 to about 99% by weight of the final asphalt-polymer blend, or any amount therebetween, for example 80, 81, 82, 83, 84, 85, 86, 87, 88, 89, 90, 91, 92, 93, 94, 95, 96, 97 and 99 percent by weight, or any amount therebetween.

A predetermined amount of the polymer-asphalt master batch is blended with a predetermined amount of the asphalt-cross linking agent blend to form a PMA blend. A person of skill in the art will recognize that the amount of the at least one polymer and the amount of the at least one cross linking agent in the PMA blend will depend on the ratio of the polymer-asphalt master batch to the asphalt-cross linking agent blend. For example, if one part of a polymer-asphalt master batch containing 6% by weight SBS polymer is added to one part of a asphalt-cross linking agent blend containing 0.40% by weight sulfur, as hereinafter described in Example 1, the resulting PMA blend will contain 3% by weight SBS polymer and 0.20% by weight sulfur.

The predetermined amount of the polymer-asphalt master batch is preferably such that the resulting PMA blend comprises about 0.5 to about 60% by weight of the at least one polymer, or any amount therebetween, for example 0.5, 1.0, 5.0, 10.0, 15.0, 20.0, 25.0, 30.0, 35.0, 40.0, 45.0, 50.0, 55.0 and 60.0 weight percent, or any amount therebetween. Preferably the amount of the at least one polymer in the resulting PMA blend comprises about 1.0 to about 20.0% by weight, or any amount therebetween, for example, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5 and 20.0 weight percent, or any amount therebetween.

The predetermined amount of the asphalt-cross linking agent blend is preferably such that the resulting PMA blend comprises between about 0.01 to about 5.0% by weight of the cross linking agent, or any amount therebetween, for example, 0.01, 0.5, 1.0, 1.5, 2.0, 2.5, 3.0, 3.5, 4.0, 4.5, and 5.0 weight percent, or any amount therebetween. Preferably the amount of cross linking agent in the resulting PMA blend is about 0.05 to about 2.0% by weight, or any amount therebetween, for example, 0.05, 0.10, 0.20, 0.30, 0.40, 0.50, 0.60, 0.70, 0.80, 0.90, 1.0, 1.1, 1.2, 1.3, 1.4, 1.5, 1.6, 1.7, 1.8, 1.9 and 2.0 weight percent, or any amount therebetween.

The PMA blend is mixed for a period of time to allow for formation of a polymer network within the first and second asphalt. Mixing of the PMA blend is performed at the same time or without substantial delay following contact of the polymer-asphalt master batch with the asphalt-cross linking agent blend. By "without substantial delay" it is meant that the mixing starts before, during or shortly after contact of the polymer master batch with the asphalt-cross linking agent blend. The mixing step is typically performed within less than 60 minutes from contact of the polymer master batch with the asphalt-cross linking agent blend, for example from 0 to about 60 minutes, or any time therebetween for example within 0, 0.5, 1.0, 2, 4, 6, 8, 10, 15, 20, 25, 30, 35, 40, 45, 50, 55 and 60 minutes, or any time therebetween. Preferably the mixing step is preformed within less than 30 minutes of the blending step, more preferably within less than 15 minutes of the blending step, and most preferably within less than 2 minutes of the blending step. Preferably mixing of the PMA blend occurs before, during or immediately after blending of the polymer-asphalt master batch with the asphalt-cross linking agent blend.

The PMA blend may be mixed using any conventional means known to one of skill in the art, for example, but not limited to, low-shear mixers, external mixers, roll mills, internal mixers, Banbury mixers, screw extruders, augers, and the like. The period of time that the PMA blend is mixed should be sufficient to ensure an effective dispersion and subsequent integration of the cross linking agent and polymer to form a polymer network within the asphalt, thus forming the PMA. Preferably, the PMA blend is mixed for about 0.5 to about 48.0 hours, or any time therebetween, for example, 0.5, 1.0, 2.0, 4.0, 6.0, 8.0, 10.0, 12.0, 14.0, 16.0, 18.0, 20.0, 22.0, 24.0, 26.0, 28.0, 30.0, 32.0, 34.0, 36.0, 38.0, 40.0, 42.0, 44.0, 46.0 and 48.0 hours, or any time therebetween. The temperature of the PMA blend during mixing should be a temperature at which the blend is handleable. Preferably, the temperature is about 120° to about 210° C., or any temperature therebetween, for example 120, 125, 130, 135, 140, 145, 150, 155, 160, 165, 170, 175, 180, 185, 190, 195, 200 and 210° C., or any temperature therebetween.

Once mixing of the PMA blend is complete and a polymer network within the asphalt has been formed, the PMA blend may be cured using any conventional means known to one of skill in the art, for example as disclosed in Canadian patent 1,321,276 (incorporated herein by reference). The PMA blend may be cured at a temperature of about 120° C. to about 200° C., or any temperature therebetween, for example, 120, 125, 130, 135, 140, 145, 150, 155, 160, 165, 170, 175, 180, 185, 190 and 200° C., or any temperature therebetween. Preferably the PMA blend is cured at a temperature of about 160° C. to about 190° C. The PMA blend may be cured for about 1 hour to about 480 hours (20 days), or any time therebetween, for example, 1, 6, 12, 18, 24, 36, 48, 60, 72, 84, 96, 108, 120, 132, 144, 156, 168, 180, 192, 204, 216, 228, 240, 252, 264, 276, 288, 300, 312, 324, 336, 348, 360, 372, 384, 396, 408, 420, 432, 444, 456, 468 and 480 hours, or any time therebetween.

Following curing, the PMA may be stored at an elevated temperature (hot-storage) until it is required for use. The PMA may be stored at a temperature of about 120° C. to about 190° C., or any temperature therebetween, for example, 120, 125, 130, 135, 140, 145, 150, 155, 160, 165, 170, 175, 180, 185 and 190° C., or any temperature therebetween. Typically, the PMA may be stored for at least 15 days.

In the examples disclosed herein, the PMAs prepared using the process of the present invention showed lower 135° C. viscosity, improved high-temperature performance, and enhanced low-temperature performance compared to PMAs of the same composition prepared using a known method wherein sulfur is added separately to a polymer-asphalt blend. The PMAs prepared using the process of the present invention also showed good homogeneity with no lumps, whereas PMAs of the same composition prepared using the known method contained lumps.

More particularly, there was an overall improvement of 5° C. in the Superpave high-low temperature spread for a PMA prepared using the process of the present invention compared to a PMA with the same composition prepared using the known method (Example 5). Furthermore, the PMA prepared using the process of the present invention had a lower phase angle and comparable creep and recovery compared to the PMA prepared using the known method.

The results in Table 4 of Example 7 indicate that the 135° C. viscosity of a PMA prepared using the process of the present invention increased during hot storage at about 150° C.; however after 15 days of hot storage, the 135° C. viscosity of the PMA was still well below the 3000 mPa·s limit as required by the Superpave specification [1]. Furthermore, the PMA was very compatible, and homogenous; and had no polymer skins, lumps or gels; nor any polymer separation.

The PMA prepared using the process of the present invention may be used in any application requiring asphalt-based products.

The present invention will be further illustrated in the following examples.

EXAMPLES

Improvement in 135° C. Viscosity Reduction and Prevention of Gelling

Example 1

A first PMA was prepared using an embodiment of the process of the present invention. A polymer-asphalt master batch "A" was prepared by high-shearing 6% by weight of a styrene-butadiene-styrene (SBS) polymer (commercial product KTR 402™) into a Husky 200/300 Pen grade asphalt with mixing for 1.5 hours. An asphalt-sulfur blend "B" was prepared by dissolving homogenously 0.40% by weight of sulfur into the Husky 200/300 Pen grade asphalt by low-shearing for 0.5 hours at 140-190° C. One part of batch "A" was added to one part of blend "B", and the resulting blend was immediately mixed by low-shearing at 180° C. for 1 hour. The PMA was cured for 17-18 hours at 175° C. After curing, the first PMA was homogenous with no lumps; and, it had a 135° C. viscosity of 1553 mPa·s.

A second PMA was prepared with exactly the same composition as the first PMA; however, a method known in the art was used instead of the process of the present invention. In the known method, a polymer-asphalt blend was prepared and the sulfur was added to this blend. The 135° C. viscosity of the second PMA was 1820 mPa·s; and, there were lumps in this sample.

Example 2

A third PMA was prepared as follows. A polymer-asphalt master batch "C" was prepared by high-shearing 3.6% by weight each of two SBS polymers (Commercial product C401 and S416) into a Husky 80/100 Pen grade asphalt and mixing for 1.5 hours. An asphalt-sulfur blend "D" was prepared by dissolving homogeneously 0.24% by weight of sulfur into the Husky 80/100 Pen grade asphalt by low-shearing for 0.5 hour at 140-170° C. Two parts of blend "D" were blended with one part of batch "C", with a delay of 0.5 hour before mixing. The PMA gelled after curing for 16-18 hours at 175° C.

A fourth PMA was produced using the same components as the fifth PMA; however, one part of batch "C" was blended with two parts of blend "D" with immediate and adequate mixing, in accordance with the process of the present invention. The resultant PMA did not gel and had a 135° C. viscosity of 1115 mPa·s, after curing at 175° C. for 16-18 hours.

Improvement in Superpave Performance Grades, Creep and Recovery, and Phase Angle Reduction

Example 3

Sample #1 was produced using a known method by adding 4% by weight of a SBS polymer (S416) to 200/300 Pen grade asphalt with the subsequent addition of 0.16% by weight of sulfur. The PMA was mixed for 2 hours and cured overnight at 175° C. The resultant PMA (sample #1) had a 135° C. viscosity of 735 mPa·s, and it was graded as PG66-37 (Table 1).

Sample #2 was produced using a known method by adding 4% by weight of SBS polymer S416 to 200/300 Pen grade asphalt with the subsequent addition of 0.23% by weight of sulfur. The PMA was mixed for 2 hours and cured overnight at 175° C. The resultant PMA (Sample #2) had a 135° C. viscosity of 1445 mPa·s, and it was graded as PG68-37 (Table 1).

Sample #3 was produced using an embodiment of the process of the present invention. A polymer-asphalt master batch "E" was prepared by high-shearing 12% by weight of the SBS polymer 5416 into the 200/300 Pen grade asphalt. An asphalt-sulfur blend "F" was prepared by blending 0.35% by weight of sulfur into the 200/300 Pen grade asphalt. One part of batch "E" was added to two parts of blend "F" with appropriate mixing. The resultant PMA (Sample #3) had, in effect, a sulfur content of 0.23% by weight and a SBS polymer content of 4%. This PMA (Sample #3) had a 135° C. viscosity of 1054 mPa·s, and it was graded as PG70-37 (Table 1).

The results shown in Table 1 indicate that the PMA prepared using the process of the present invention (sample #3) having the same composition as the PMA prepared using a known process of the prior art (sample #2) showed an increase of at least 2° C. in the height-temperature grade, while having a lower 135° C. viscosity.

cured overnight at 175° C. The resultant PMA (Sample #4) had a 135° C. viscosity of 1820 mPa·s, and it was graded as PG66-36 (Table 2).

Sample #5 was prepared using the process of the present invention. A polymer-asphalt master batch "G" was prepared by high-shearing 6% by weight of the SBS polymer KTR 402 into 200/300 Pen grade asphalt. An asphalt-sulfur blend "H" was prepared by dissolving homogeneously 0.40% by weight of sulfur in 200/300 Pen grade asphalt. One part of batch "G" was added to one part of blend "H" with appropriate mixing. The resultant PMA (Sample #5) had, in effect, a sulfur content of 0.20% and a SBS polymer content of 3.00%. The 135° C. viscosity of sample #5 was 1553 mPa·s, and the grade was PG69-38 (Table 2).

The results shown in Table 2 indicate that a PMA produced using the process of the present invention (sample #5) had a high-temperature performance improvement of 3° C.; and, a

TABLE 1

Comparison of polymer modified asphalts (PMA's) samples #1-3 prepared with 4% by weight SBS polymer S416 and 0.16-0.23% by weight sulfur in 200/300 Pen grade asphalt using a prior art process of preparation (old process, samples #1 and #2) and the process of the present invention (sample #3)

| SUMMARY OF TEST RESULTS | 1 | 2 | 3 |
|---|---|---|---|
| Sample Description | 200/300 + 4.0% SBS + 0.16% S Old Process | 200/300 + 4.0% SBS + 0.23% S Old Process | 1 Pt (200/300 + 12.0% SBS) + 2.0 Pts (200/300 + 0.35% S) |
| Curing time [Hours] | | 16-18 Hours | 16-18 Hours |
| Sulfur Content | 0.16% | 0.23% | 0.23% This Invention |
| STANDARD TESTS | | | |
| Penetration at 25° C., [dmm] (100 g/5 s) | 130 | 130 | 124 |
| Softening Point, [° C.] | 58.0 | 65.6 | 63.0 |
| SUPERPAVE TESTS | | | |
| Original Binder Properties | | | |
| Viscosity at 135° C. [mPa · s] | 735 | 1445 | 1054 |
| Dynamic Shear (G*/sin δ), (Min. 1.0 kPa), [kPa] | 1.03 | 1.11 | 1.08 |
| Temperature, [° C.] | 66 | 70 | 71 |
| Phase Angle δ | 76.7 | 65.4 | 66.7 |
| Toughness and Tenacity [J] | | | |
| Rolling Thin Film Ovent Test (RTFOT) (T240) | | | |
| RTFOT Mass Loss, [%] | −0.869 | −0.733 | −0.859 |
| Dynamic Shear (G*/sin δ), (Min. 2.20 kPa), [kPa] | 2.31 | 2.22 | 2.27 |
| Temperature, [° C.] | 66 | 68 | 70 |
| Phase Angle δ | 69.6 | 62.4 | 62.0 |
| Creep and Recovery at 100 Pa/3200 Pa Stress [%] | 35.9 16.4 | 70.9 61.8 | 50.6 24.8 |
| Test Temperature [° C.] | 64 | 64 | 70 |
| Pressure Aging Vessel (PAV) Residue | | | |
| PAV Aging Temperature, [° C.] | 100 | 100 | 100 |
| Dynamic Shear [G*(sin δ)], (Max. 5000 kPa), [kPa] | 1326 | 1511 | 1490 |
| Temperature, [° C.] | 19 | 19 | 19 |
| Creep Stiffness (S − max. 300 MPa) @ 60 s | 264 | 296 | 286 |
| (m value − min. 0.300) @ 60 s | 0.303 | 0.308 | 0.306 |
| Temperature, [° C.] | −27.0 | −27.0 | −27.0 |
| Actual Grading | PG66-37 | PG68-37 | PG70-37 |
| High-Low Temperature Spread | 102 | 105 | 107 |
| Superpave MP1 Grading | PG64-37 | PG64-37 | PG70-37 |

Example 4

Sample #4 was prepared using a known method by blending 3% by weight of another SBS polymer KTR 402 to 200/300 Pen grade asphalt with the subsequent addition of 0.20% by weight sulfur. The PMA was mixed for 2 hours and low-temperature performance enhancement of 2° C., while having lower 135° C. viscosity, compared to a PMA with the same composition but produced using the known method (sample #4). There was an overall improvement of 5° C. in the Superpave high-low temperature spread for sample #5 compared to sample #4. Also, sample #5 had a lower phase angle and comparable creep and recovery to sample #4.

TABLE 2

Comparison of polymer modified asphalts (PMA's) samples
4 and #5 prepared with 3% of SBS polymer KTR
402 and 0.20% of sulfur in 200/300 Pen grade asphalt using
a prior art process of preparation (old process, sample
4) and the process of the present invention (sample #5)

| SUMMARY OF TEST | 4 | 5 |
|---|---|---|
| Sample Description | 200/300 + 3.0% SBS2 + 0.20% | 1 Pt (200/300 + 6.0% SBS2) + 1.0 Pts (200/300 + 0.40% |
| Curing time [Hours] | 16-18 Hours | 16-18 Hours |
| Effective Polymer Content | 3.00% | 3.00% |
|  | Old Process | This Invention |
| STANDARD TESTS |  |  |
| Penetration at 25° C., [dmm] (100 g/5 s) | 135 | 126 |
| Softening Point, [° C.] | 68.0 | 70.3 |
| SUPERPAVE Original Binder Properties |  |  |
| Viscosity at 135° C. [mPa · s] | 1820 | 1553 |
| Dynamic Shear (G*/sin δ), (Min. 1.0 kPa), [kPa] | 1.00 | 1.04 |
| Temperature, [° C.] | 69 | 74 |
| Phase Angle δ | 63.2 | 58.7 |
| Toughness and Tenacity [J] |  |  |
| Rolling Thin Film Ovent Test (RTFOT) (T240) |  |  |
| RTFOT Mass Loss, [%] | −0.664 | −0.590 |
| Dynamic Shear (G*/sin δ), (Min. 2.20 kPa), [kPa] | 2.33 | 2.10 2.27 |
| Temperature, [° C.] | 66 | 70 69 |
| Phase Angle δ | 61.7 | 58.1 58.1 |
| Creep and Recovery at 100 Pa/3200 Pa Stress [%] | 78.2 85.6 | 82.9 87.4 |
| Test Temperature [° C.] | 64 | 64 |
| Pressure Aging Vessel (PAV) Residue |  |  |
| PAV Aging Temperature, [° C.] | 100 | 100 |
| Dynamic Shear [G*(sin δ)], (Max. 5000 kPa), [kPa] | 2389 | 1211 |
| Temperature, [° C.] | 16 | 19 |
| Creep Stiffness (S − max. 300 MPa) @ 60 s | 306 | 248 285 |
| (m value − min. 0.300) @ 60 s | 0.294 | 0.321 0.307 |
| Temperature, [° C.] | −27.0 | −27.0 −28.0 |
| Actual Grading | PG66-36 | PG69-38 |
| High-Low Temperature Spread | 102 | 107 |
| Superpave MP1 Grading | PG64-34 | PG64-37 |

Hot-Storage Stability

Example 5

Sample #6, a PG76-xx PMA, was prepared using the process of the present invention. A polymer-asphalt master batch "K" was prepared by high-shearing 7.5% by weight of SBS polymer 5416 into 85/100 Pen grade asphalt. An asphalt-sulfur blend "L" was prepared by blending 0.30% by weight of sulfur into the asphalt. One part of batch "K" was added to one part of blend "L" with appropriate mixing. The resultant PMA (Sample #6) had, in effect, a sulfur content of 0.15% by weight and a SBS polymer content of 3.75% by weight. After overnight curing at 175° C., 0.50% by weight of anti-oxidant Polygard HR was stirred into Sample #6. It was then placed in hot storage at about 150° C., in order to check the increase in 135° C. viscosity with increasing hot-storage time. The hot-storage apparatus was cylindrical, horizontally oriented tank equipped with a mixer, manhole and a heating coil. In the bottom of the tank was a vent for the sampling. The diameter of the tank was 180 mm, the length 470 mm, the total volume was approximately 12 L. The heating coil was connected with a thermostat. The whole tank was insulated. The tank was constructed to resemble the common asphalt plant storage tank as closely as possible. The heating coil was designed so that the heating oil had to be at considerably higher temperature (~30° C. higher) than the temperature of asphalt in the tank. The PMA (Sample #6) went through 15 days of hot storage and samples of the PMA were removed on day 0 (Sample #6A) and each consecutive weekday (Samples #6A1-#6A15) and tested. The results are shown in Table 3.

TABLE 3

Hot-storage characteristics of PG76-xx PMA (Sample #6) prepared
using the process of the present invention

| Day No. | Sample Number | Tank Temp. [° C.] | 135° C. Viscosity [mPa · s] | DSR Test Temp [° C.] | DSR G*/si δ | Phase Angle δ |
|---|---|---|---|---|---|---|
| 0 | 6A | 148 | 1518 | 78 | 1.04 | 74.5 |
| 1 | 6A1 | 150 | 1442 | 77 | 1.01 | 73.4 |
| 2 | 6A2 | 150 | 1598 | 78 | 1.01 | 74.6 |
| 3 | Saturday |  |  |  |  |  |
| 4 | Sunday |  |  |  |  |  |
| 5 | 6A5 | 150 | 1728 | 78 | 1.17 | 72.7 |
| 6 | 6A6 | 150 | 1851 | 78 | 1.21 | 72.2 |
| 7 | 6A7 | 150 | 1916 | 78 | 1.28 | 71.7 |
| 8 | 6A8 | 150 | 2084 | 78 | 1.29 | 71.2 |
| 9 | 6A9 | 150 | 2084 | 79 | 1.27 | 71.1 |
| 10 | Saturday |  |  |  |  |  |
| 11 | Sunday |  |  |  |  |  |
| 12 | 6A12 | 150 | 2260 | 80 | 1.11 | 70.8 |
| 13 | 6A13 | 150 | 2516 | 81 | 1.17 | 70.6 |
| 14 | 6A14 | 150 | 2441 | 82 | 1.14 | 70.3 |
| 15 | 6A15 | 150 | 2597 | 82 | 1.21 | 69.5 |

The results in Table 3 indicate that 135° C. viscosity of the PMA (Sample #6) increased during hot storage; however after 15 days of hot storage, the 135° C. viscosity of Sample #6A15 was still well below the 3000 mPa·s limit as required by the Superpave specification [1]. Furthermore, Sample #6A15 was very compatible, and homogenous; and had no polymer skins, lumps or gels; nor any polymer separation.

All citations are hereby incorporated by reference.

The present invention has been described with regard to one or more embodiments. However, it will be apparent to persons skilled in the art that a number of variations and modifications can be made without departing from the scope of the invention as defined in the claims.

REFERENCES

1. AASHTO Standards M320-05, 25th Edition, (2005) "Standard specification for performance graded asphalt binder." *Standard Specification for Transportation Materials and Methods of Sampling and Testing. Part 1B. American Association of State Highway and Transportation Officials.* Washington, D.C. M320-1 to 7.
2. Proposed ASTM method, "Standard Practice for Multi Stress Creep Recovery Test of Asphalt Binder Using a Dynamic Shear Rheometer (MSCR)," 2006.

What is claimed is:

1. A process for preparing a polymer modified asphalt (PMA) comprising:
   i) providing a polymer-asphalt master batch comprising at least one polymer and a first asphalt, wherein the polymer-asphalt master batch is prepared by mixing at least one polymer into the first asphalt at a temperature of about 150 to about 200° C.;

ii) providing an asphalt-cross linking agent blend comprising at least one cross linking agent and a second asphalt;
iii) blending a predetermined amount of the polymer-asphalt master batch with a predetermined amount of the asphalt-cross linking agent blend to form a PMA blend; and
iv) mixing the PMA blend for a period of time to allow a polymer network to form within the first and second asphalt, wherein the mixing step is performed without substantial delay following blending step iii), wherein in mixing step iv) the PMA blend is mixed for about 0.5 to about 48.0 hours at a temperature of about 120 to about 210° C., and the process further comprises curing the mixed PMA at about 120 to about 200° C. for about 1 hour to about 20 days.

2. The process of claim 1, wherein the at least one polymer is about 0.5 to about 60% by weight of the polymer-asphalt master batch.

3. The process of claim 1, wherein the at least one cross linking agent is about 0.01 to about 5.00% by weight of the asphalt-cross linking agent blend.

4. The process of claim 1, wherein in blending step iii) the PMA blend comprises about 0.5 to about 20% by weight of the at least one polymer and between about 0.05 to about 2.0% by weight of the cross linking agent.

5. The process of claim 1, wherein in blending step iii) the predetermined amount of the polymer-asphalt master batch is added to the predetermined amount of the asphalt-cross linking agent blend.

6. The process of claim 1 upon blending or immediately following the blending step iii) without delay.

7. The process of claim 1, wherein the first asphalt and the second asphalt are of the same asphalt composition.

8. The process of claim 1, wherein the cross linking agent is selected from the group consisting of sulfur, sulfur containing cross linking agents, a mercaptotriazine cross linking agent and mixtures thereof.

9. The process of claim 1, wherein the polymer is selected from the group consisting of a styrene-butadiene-styrene (SBS) polymer, urethane, polyester, styrenic, an olefin thermoplastic elastomer and mixtures thereof.

* * * * *